(12) United States Patent
Iwaida et al.

(10) Patent No.: US 7,068,493 B2
(45) Date of Patent: Jun. 27, 2006

(54) POLARIZING PROPERTY ELECTRODE FOR ELECTRICAL DOUBLE LAYER CAPACITOR AND MANUFACTURING METHOD OF POLARIZING PROPERTY ELECTRODE FOR ELECTRICAL DOUBLE LAYER CAPACITOR, AND MANUFACTURING METHOD OF ELECTRODE SHEET FOR ELECTRICAL DOUBLE LAYER CAPACITOR

(75) Inventors: Manabu Iwaida, Saitama (JP); Shigeki Oyama, Saitama (JP); Kenichi Murakami, Saitama (JP); Kenji Sato, Saitama (JP); Kouki Ozaki, Aichi (JP); Masanori Tsutsui, Aichi (JP)

(73) Assignees: Honda Motor Co., Ltd., Tokyo (JP); Daido Metal Company Ltd., Aichi (JP)

( * ) Notice: Subject to any disclaimer, the term of this patent is extended or adjusted under 35 U.S.C. 154(b) by 0 days.

(21) Appl. No.: 11/041,371

(22) Filed: Jan. 25, 2005

(65) Prior Publication Data

US 2005/0157448 A1    Jul. 21, 2005

Related U.S. Application Data

(62) Division of application No. 10/721,757, filed on Nov. 26, 2003, now Pat. No. 6,872,616.

(30) Foreign Application Priority Data

Nov. 29, 2002 (JP) ............ P. 2002-347942
Nov. 29, 2002 (JP) ............ P. 2002-349174

(51) Int. Cl.
*H01G 9/00* (2006.01)
*H01G 9/04* (2006.01)

(52) U.S. Cl. ............ 361/502; 361/508; 29/25.03

(58) Field of Classification Search ............ 361/502, 361/504, 507, 508–509, 516, 527, 528–529, 361/532; 29/25.03; 502/427; 428/425.8, 428/408, 412

See application file for complete search history.

(56) References Cited

U.S. PATENT DOCUMENTS

| | | | |
|---|---|---|---|
| 5,099,398 A | | 3/1992 | Kurabayashi et al. |
| 6,094,338 A | * | 7/2000 | Hirahara et al. ............ 361/502 |
| 6,306,509 B1 | * | 10/2001 | Takeuchi et al. ......... 428/425.8 |
| 6,914,768 B1 | * | 7/2005 | Matsumoto et al. ........ 361/502 |
| 2005/0162813 A1 | * | 7/2005 | Fujino ......................... 361/503 |
| 2005/0181941 A1 | * | 8/2005 | Sugo et al. ................ 502/427 |

FOREIGN PATENT DOCUMENTS

| | | |
|---|---|---|
| JP | 7-105316 | 11/1995 |
| JP | HEI 11-154630 | 8/1999 |
| JP | 2000-49052 | 2/2000 |
| JP | 2000-235938 | 8/2000 |
| JP | 2001-307964 | 11/2001 |
| JP | 2002-175950 | 6/2002 |

* cited by examiner

*Primary Examiner*—Anthony Dinkins
(74) *Attorney, Agent, or Firm*—Arent Fox PLLC

(57) ABSTRACT

In an electrode drying process in which the electrode is molded in a sheet shape by kneading activated carbon powder, a binding material and an organic solvent for lubrication and a polarizing property electrode is formed by heating and removing the organic solvent for lubrication in the molded electrode, the organic solvent for lubrication included in the electrode is removed in a state in which the above electrode is widened in the sheet shape. In a manufacturing method of an electrode sheet for the electrical double layer capacitor, continuous drying and vacuum drying are performed in a drying process.

5 Claims, 8 Drawing Sheets

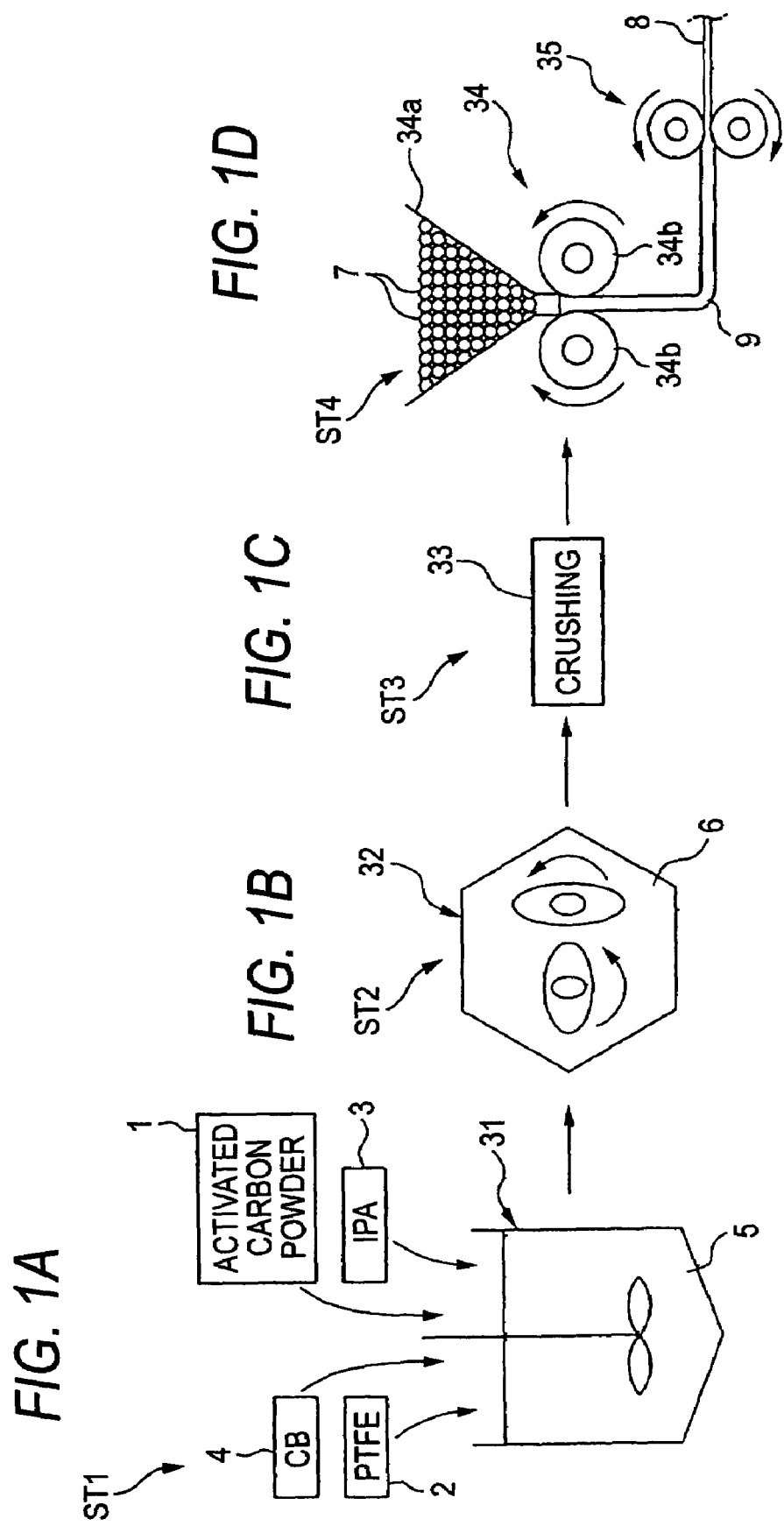

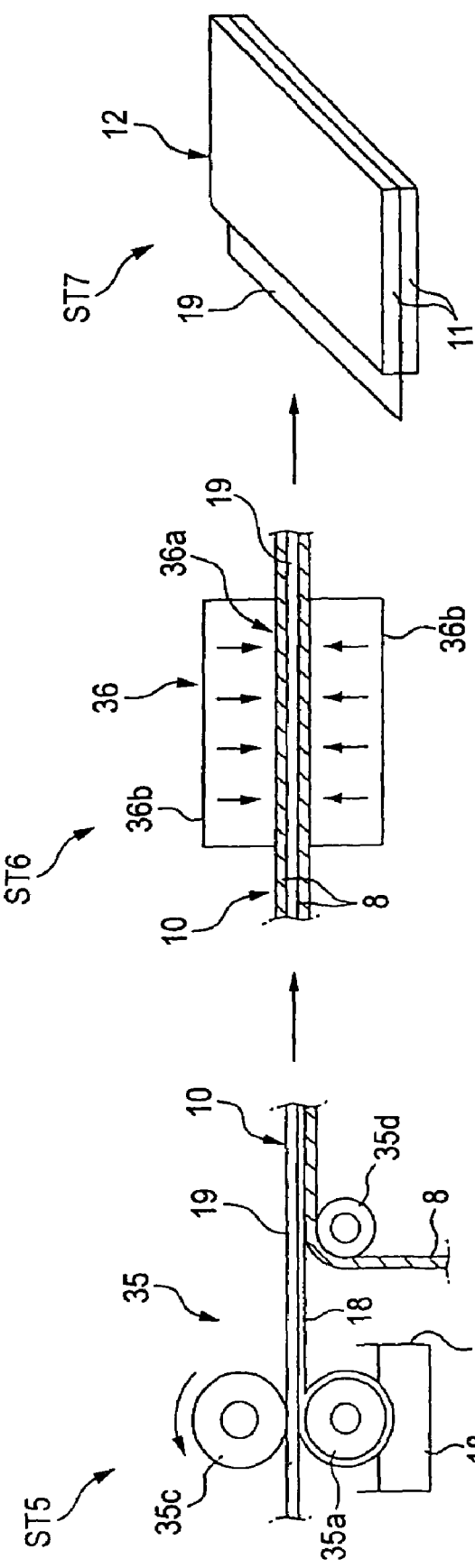

POLARIZING PROPERTY ELECTRODE FOR ELECTRICAL DOUBLE LAYER CAPACITOR AND MANUFACTURING METHOD OF POLARIZING PROPERTY ELECTRODE FOR ELECTRICAL DOUBLE LAYER CAPACITOR, AND MANUFACTURING METHOD OF ELECTRODE SHEET FOR ELECTRICAL DOUBLE LAYER CAPACITOR

CROSS-REFERENCE TO RELATED APPLICATION

This is a Divisional Application which claims the benefit of pending U.S. patent application Ser. No. 10/721,757, filed Nov. 26, 2003, now U.S. Pat. No. 6,872,616. The disclosure of the prior application is hereby incorporated herein in its entirety by reference.

BACKGROUND OF THE INVENTION

The present invention relates to a polarizing property electrode for an electrical double layer capacitor and its manufacturing method.

Further, the present invention relates to a manufacturing method of an electrode sheet for an electrical double layer capacitor, and particularly relates to the improvement of a drying process for drying the electrode sheet.

The electrical double layer capacitor has a large capacity of a farad class and is excellent in charge and discharge cycle characteristics. Therefore, the electrical double layer capacitor is used in uses such as a backup power source of an electric device, a battery mounted to a car, etc.

This electrical double layer capacitor is constructed by arranging a pair of polarizing property electrodes, a separator arranged between the pair of polarizing property electrodes, and an electrolyte. The polarizing electrodes separated by the separator are constructed so as to respectively act as an anode and a cathode. Activated carbon having minute holes is normally used as the material of the polarizing electrode of such an electrical double layer capacitor. The electrical double layer capacitor is formed by adsorbing and gathering electrolytic ions within the electrolyte within the minute holes of the activated carbon so that the anode and the cathode of the capacitor are constructed.

The manufacturing method described in the following patent literature 1 is disclosed as the manufacturing method of the above polarizing property electrode. In this manufacturing method, an admixture constructed by activated carbon powder, polymer resin including fluorine and a liquid-shaped lubricant (solvent for lubrication) is molded in a sheet shape. Thereafter, the liquid-shaped lubricant is removed by a means of heating, extraction, etc. This patent literature does not concretely show to which extent the liquid-shaped lubricant is removed by what means.

[Patent Literature 1]
  JP-B-7-105316 (Japanese Patent Publication (KOKOKU) No. 7-105316)

Further, the electrical double layer capacitor has a large capacity of a farad class, and is excellent in charge and discharge cycle characteristics. Therefore, the electrical double layer capacitor is used as a backup power source of an electric device and a battery of each of various kinds of transports such as an automobile. Further, it is also considered that the electrical double layer capacitor is used in a use such as the storage of electric power in the nighttime in the future from the viewpoint of energy effective utilization.

The structure of the electrical double layer capacitor and the charging and discharging mechanism will be briefly explained. First, in this structure, a polarizing property electrode for the electrical double layer capacitor is dipped into an ionic property solution. This polarizing property electrode is constructed by a sheet (hereinafter called an electrode sheet) nipping a current collecting foil by two sheet-shaped activated carbons (sheet-shaped electrodes), and an insulating separator (hereinafter called a separator) permeating ions thereinto. In the charging and discharging mechanism, a voltage is applied to the above polarizing property electrode for the electrical double layer capacitor to such an extent that no electrolysis is caused. The charging and discharging operations are performed by opposing plus and minus electricities at the interface.

Accordingly, when moisture is left in the electrode sheet and the voltage is applied, its moisture is electrolyzed in the above nature of the electrical double layer capacitor and there is a fear that a reduction in performance of the electrical double layer capacitor is caused. Therefore, in a manufacture process, a drying process for removing the moisture of the electrode sheet to such an extent that there is no practical problem, is required.

For example, there is the following method as a manufacture method of the electrical double layer capacitor including the drying process with the moisture removal as an object. Namely, in this method, the polarizing property electrode for the electrical double layer capacitor constructed by the electrode sheet and the separator is stored to a cylindrical container having a bottom as a container for the electrical double layer capacitor. Thereafter, the container is sealed by a cover body having a liquid injecting port. Next, the entire container is dried in an atmosphere having a dew point of −20° C. or less. A non-water based electrolyte is then injected from the above liquid injecting port, and this liquid injecting port is sealed (for example, see patent literature 2).

Further, for example, there is also a method in which a raw material of the sheet-shaped electrode constructed by carbon based powder, an electrically conductive assistant and a binder is mixed and kneaded and the drying process of moisture removal is performed with respect to this kneaded object (for example, see patent literature 3).

[Patent Literature 2]
  JP-A-2000-49052 (pp. 3–4)

[Patent Literature 3]
  JP-A-2001-307964 (pp. 4–5)

The activated carbon used in the electrical double layer capacitor originally has a property excellent in the adsorbing ability of a chemical substance. This adsorbing ability is originated in the existence of the minute hole of the above activated carbon. Accordingly, when the liquid-shaped lubricant is not sufficiently removed and is left within the minute hole, problems exist in that the formation of the electrical double layer capacitor using the adsorption and the gathering of the electrolytic ions is prevented and the internal resistance of the electrical double layer capacitor is increased.

Further, as mentioned above, when the moisture is mixed into the electrode sheet in applying the voltage to the polarizing property electrode for the electrical double layer capacitor, this moisture causes the electrolysis. Therefore, the problems of a reduction in electrostatic capacity of the electrical double layer capacitor, a rise in resistance, deterioration of durability, etc. are caused.

However, since the activated carbon (carbonaceous powder) constituting the electrode sheet is porous, the adsorbing property of the moisture is very high. Moreover, when the respective raw materials are mixed, etc., the organic solvent of an alcohol system is added to facilitate the mixture. Therefore, a reciprocal problem exists in that the moisture inevitably exists in the raw materials.

Accordingly, the drying process for setting the remaining amounts of the moisture and the organic solvent in the electrode sheet in the manufacture process to very low levels in its manufacture process is indispensable to the security of durability and reliability of the electrical double layer capacitor for a long period.

However, in the above patent literature 2, the polarizing property electrode for the electrical double layer capacitor constructed by the electrode sheet and the separator is dried in a cylindrical winding state within the container. Therefore, it is difficult to preferably dry the polarizing property electrode for the electrical double layer capacitor until its central portion.

Further, in the above patent literature 3, the drying operation is performed at a stage at which the raw material of the sheet-shaped electrode is mixed and kneaded instead of the electrode sheet. Therefore, a problem exists in that the sheet-shaped electrode again absorbs the moisture after that until the kneaded object is rolled and the sheet-shaped electrode is manufactured and is further completed as the electrode sheet by sticking this sheet-shaped electrode to a foil.

SUMMARY OF THE INVENTION

The present invention is made in consideration of the above situation, and its object is to provide a polarizing electrode reduced in the remaining amount of a solvent for lubrication, etc., and its manufacturing method.

The present invention adopts the following construction to achieve the above object.

A manufacturing method of a polarizing property electrode for an electrical double layer capacitor in the present invention is characterized in that the manufacturing method comprises an electrode molding process (e.g., a raw material mixing process ST1 to a sheet-forming and rolling process ST4 in an embodiment mode) for making a sheet for an electrode (e.g., the sheet 8 for an electrode in the embodiment mode) by kneading and molding activated carbon powder (activated carbon powder 1 in the embodiment mode), a binding material (e.g., PTFE2 in the embodiment mode) and an organic solvent for lubrication (e.g., IPA3 in the embodiment mode) in a sheet shape, and an electrode drying process (e.g., a current collecting body adhering process ST5 to a continuous drying process ST6 in the embodiment mode) for forming the polarizing property electrode (e.g., the polarizing property electrode 11 in the embodiment mode) by removing the organic solvent for lubrication, wherein an organic chemical compound (e.g., the remaining isopropanol, diisopropyl ether, acetone, etc. in the embodiment mode) included in the sheet for an electrode in the electrode drying process is removed in a state in which the sheet for an electrode is widened approximately in a plane shape.

In accordance with such a manufacturing method of the polarizing electrode, the organic chemical compound such as the organic solvent for lubrication, etc. in the electrode drying process is removed in the state in which the sheet for an electrode is widened approximately in the plane shape.

Accordingly, a scattered object (evaporated object) of the above organic chemical compound does not easily stay within an atmosphere in the vicinity of the sheet surface for an electrode. As a result, the removing efficiency of the organic chemical compound from the sheet for an electrode is improved. Then, the amount of the organic chemical compound left within a minute hole of the activated carbon powder can be reduced. Accordingly, there is no fear that the formation of the electrical double layer using the adsorption of an electrolytic ion with respect to the activated carbon powder is prevented. Thus, the electrical double layer is sufficiently formed within the minute hole of the activated carbon powder, and the polarizing property electrode having small diffusion resistance between the activated carbon powder and the electrolyte is obtained.

Further, the manufacturing method of the polarizing property electrode for the electrical double layer capacitor in the present invention is characterized in that the organic chemical compound (e.g., the remaining IPA, DIPE, PC, acetone, etc. in the embodiment mode) included in the sheet for an electrode (e.g., the sheet 8 for an electrode in the embodiment mode) is removed in the electrode drying process (e.g., the current collecting body adhering process ST5 to the continuous drying process ST6 in the embodiment mode) until the content of the organic chemical compound becomes 800 ppm or less with respect to the weight of the sheet for an electrode in the above-mentioned manufacturing method of the polarizing property electrode for the electrical double layer capacitor.

In accordance with such a manufacturing method of the polarizing electrode, the organic chemical compound such as the organic solvent for lubrication, etc. in the continuous electrode drying process is removed until the organic chemical compound has a concentration of 800 ppm or less (with respect to the weight of the electrode sheet). Accordingly, subsequent cell drying is easily performed and the amount of the organic chemical compound left within the minute hole of the activated carbon powder can be reduced. Therefore, there is no fear that the formation of the electrical double layer using the adsorption of the electrolytic ion with respect to the activated carbon powder is prevented. Thus, the electrical double layer is sufficiently formed within the minute hole of the activated carbon powder, and the polarizing property electrode having small diffusion resistance between the activated carbon powder and the electrolyte is obtained.

A polarizing property electrode (e.g., the polarizing property electrode 11 in the embodiment mode) for an electrical double layer capacitor in the present invention is characterized in that the polarizing property electrode for the electrical double layer capacitor is constructed by mixing a binding material (e.g., PTFE2 in the embodiment mode) into activated carbon powder (e.g., activated carbon powder 1 in the embodiment mode), and the concentration of an organic chemical compound (e.g., the remaining IPA, DIPE, PC, acetone, etc. in the embodiment mode) included within the polarizing property electrode is 800 ppm or less (with respect to the weight of a sheet for an electrode). No binding material within the polarizing electrode is included in the organic chemical compound.

In accordance with such a polarizing property electrode for the electrical double layer capacitor, since the concentration of the organic chemical compound included within the polarizing property electrode is set to 800 ppm or less (with respect to the weight of the sheet for an electrode), the amount of the organic chemical compound left within the minute hole of the activated carbon powder is small, and there is no fear that the formation of the electrical double layer using the adsorption of the electrolytic ion is prevented. Thus, the electrical double layer is sufficiently formed within the minute hole of the activated carbon powder, and the diffusion resistance between the activated carbon powder and the electrolyte is reduced.

When the concentration of the organic chemical compound exceeds 800 ppm (with respect to the weight of the sheet for an electrode), it is very difficult to usefully remove the organic chemical compound of the electrode body by heating and pressure reduction in the manufacture of the electrical double layer capacitor using such an electrode. As a result, it is not preferable since the formation of the electrical double layer using the adsorption of the electrolytic ion is prevented, and the diffusion resistance between the activated carbon powder and the electrolyte is increased, and electrode performance as the polarizing property electrode for the electrical double layer capacitor is reduced.

Further, the present invention is made in consideration of the above situation, and its object is to provide a manufacturing method of the electrode sheet for the electrical double layer capacitor able to set the remaining amount of moisture, etc. in the electrode sheet to a very low value and causing no electrolysis of water at the actual using time and able to maintain durability and reliability for a long period.

To achieve the above object, the manufacturing method of an electrode sheet for an electrical double layer capacitor in the present invention is characterized in that the manufacturing method executes a process for mixing and kneading a raw material including carbonaceous powder, an electrically conductive assistant and a binder, and making a molding material; a process for molding and rolling this molding material and forming a long sheet-shaped electrode; a process for sticking this sheet-shaped electrode and a current collecting foil and making the electrode sheet; and a drying process for drying the electrode sheet; wherein the drying process particularly includes continuous drying for passing the electrode sheet through the drying room of a continuous drier and drying the electrode sheet while the electrode sheet is drawn out; and vacuum drying for storing the electrode sheet of the roll shape after this continuous drying into the vacuum room of a vacuum drier and drying the electrode sheet.

In accordance with this construction, the drying process is performed after the electrode sheet is formed. Namely, the electrode sheet is dried in a state in which the electrode sheet itself is completed. This drying process performs both the continuous drying and the vacuum drying in a widening state of the electrode sheet. Therefore, the remaining amounts of moisture and an organic solvent in the electrode sheet can be set to very low values.

The sheet-shaped electrode is normally dried by blowing a heating wind from a nozzle against the sheet-shaped electrode. However, there is a case in which metallic fine powder within piping (e.g., piping connecting a heater and the nozzle), deteriorating powder of a heating wire in the heater, etc. are mixed into this heating wind. In this case, these powders are attached to the electrode sheet surface and become impurities and therefore become one cause of a reduction in durability of the electrical double layer capacitor.

Therefore, when the heating wind is used in the drying process of the electrode sheet, it is also very important to strictly control the impurity amount mixed into this heating wind so as to secure the durability and reliability of the electrical double layer capacitor for a long period.

With respect to this matter, in the present invention, the electrode sheet is dried by blowing the heating wind passing through a hepafilter against the electrode sheet in the above continuous drying. Accordingly, even when the impurities such as the deteriorating powder of the heater, etc. are included in the heating wind, these impurities can be removed by a hepafilter having ability able to catch and collect grains of 0.3 μm or more by 99.97% or more. Therefore, no impurities are attached to the electrode sheet.

BRIEF DESCRIPTION OF THE DRAWINGS

FIGS. 1A to 1D show a process view for explaining the manufacturing method of an electrical double layer capacitor in an embodiment mode of the present invention.

FIGS. 2A to 2C show a process view for explaining the manufacturing method of the electrical double layer capacitor of this embodiment mode.

DETAILED DESCRIPTION OF THE PREFERRED EMBODIMENTS

Figure 3A:
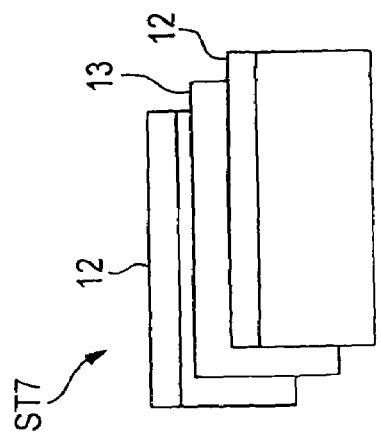
FIGS. 3A to 3D show a process view for explaining the manufacturing method of the electrical double layer capacitor of this embodiment mode.

The embodiment modes of the present invention will next be explained with reference to the drawings.

The manufacturing method of an electrical double layer capacitor explained in an embodiment mode of the present invention is mainly constructed by an electrode molding process for kneading and molding activated carbon powder, a binding material and an organic solvent for lubrication in a sheet shape, an electrode drying process for forming a polarizing property electrode by heating and removing the above organic solvent for lubrication, a winding process for obtaining a winding body by overlapping and winding the above polarizing property electrode and a separator, a vacuum drying process for removing an organic chemical compound left within the above winding body by vacuum drying after the above winding body is inserted into a capacity container, and a liquid injecting process for injecting an electrolyte to the above capacitor container. Each of FIGS. 1 to 3 shows a process view for explaining the contents of each process. Each process will next be sequentially explained with reference to FIGS. 1 to 3.

FIGS. 1A to 1D show a process view of the electrode molding process for kneading and molding the activated carbon powder, the binding material and the organic solvent for lubrication in a sheet shape. The electrode molding process is constructed by a raw material mixing process ST1 shown in FIG. 1A, a kneading process ST2 shown in FIG. 1B, a crushing process ST3 shown in FIG. 1C, and a sheet-forming and rolling process ST4 shown in FIG. 1D.

First, as shown in FIG. 1A, in the raw material mixing process ST1, mixing powder 5 is obtained by putting the raw material of the polarizing property electrode into an agitator 31 and mixing the raw material. The put-into raw material is activated carbon powder 1, polyfluoroethylene 2 (hereinafter described as PTFE2), isopropyl alcohol 3 (hereinafter described as IPA3) and carbon black 4 (hereinafter described as CB4). For example, a general agitator with a uniaxial blade, etc. can be used as the agitator 31.

For example, the activated carbon powder 1 can be constructed by using a material obtained by burning and carbonizing a refractory graphite property material such as phenol resin, etc. and then performing activation processing (activating processing) using water vapor, etc. and further crushing this processed material. The PTFE2 (binding material) is changed into fibers in subsequent kneading process ST2 so that the PTFE2 binds the activated carbon powder 1, etc. Further, the IPA3 (organic solvent for lubrication) smoothly mixes the raw materials, etc. in this process ST1 and the next kneading process ST2. The CB4 gives an electrically conductive property to the polarizing property electrode. The organic solvent for lubrication is not limited to the IPA, but other kinds of alcohol, ketone, etc. may be also used in this organic solvent for lubrication. Further, acetylene black and ketchen black, etc. may be also used in the CB4.

For example, the mixing ratio of each raw material is preferably set such that the activated carbon powder 1 is set to 96 to 50 parts by weight, the PTFE2 2 to 20 parts by weight, the IPA3 2 to 80 parts by weight, and the CB4 is set to 0 to 20 parts by weight.

Next, as shown in FIG. 1B, in the kneading process ST2, the mixing powder 5 obtained in the raw material mixing process ST1 is put into a kneader 32 and is kneaded. Thus, the PTFE2 is changed into fibers by applying shearing force to the mixing powder and the mixing powder is changed into a lump-shaped object 6. For example, a general biaxial kneader can be used as the kneader 32.

Next, as shown in FIG. 1C, in the crushing process ST3, the lump-shaped object 6 obtained in the kneading process ST2 is crushed by a crusher 33 so that a granular object is obtained. For example, the lump-shaped object 6 is preferably crushed until the granular object has a grain diameter of about 0.1 to 1 mm. For example, a general shearing type crusher, etc. can be used as the crusher 33.

Next, as shown in FIG. 1D, in the sheet-forming and rolling process ST4, the granular object 7 obtained in the crushing process ST3 is changed into a sheet and is rolled so as to have a predetermined thickness so that the sheet 8 for an electrode is obtained. A sheet molding machine 34 as shown in FIG. 1D is used to change the granular object 7 into the sheet. This sheet molding machine 34 has a hopper 34a for putting-into the granular object 7, and a pair of rollers 34b, 34b arranged on the outlet side of the hopper 34a. The granular object 7 is supplied between the pair of rollers 34b and 34b from the outlet of the hopper 34a, and is compressed so that a sheet 9 is obtained. Subsequently, this sheet 9 is sent to a rolling machine 35 constructed by a pair of rolling rollers 35a, and is rolled so that the sheet 8 for an electrode is obtained. The sheet 9 is preferably rolled until the sheet 8 for an electrode has about 130 to 160 μm in thickness.

Next, FIGS. 2A to 2C show a process view of the electrode drying process for forming the polarizing property electrode by heating and removing the IPA3 (organic solvent for lubrication). The electrode drying process is constructed by a current collecting body adhering process ST5 shown in FIG. 2A and a continuous drying process ST6 shown in FIG. 2B. FIG. 2C shows a perspective view of the polarizing electrode.

First, in the current collecting body adhering process ST5 shown in FIG. 2A, a current collecting body 19 constructed by an aluminum (Al) foil is adhered to the sheet 8 for an electrode obtained in the sheet-forming and rolling process ST4 by using an adhering device 35 so that an electrode body sheet 10 is obtained. The adhering device 35 is constructed by a transfer roller 35a for coating the current collecting body 19 with an adhesive 18, an adhesive container 35b filled with the adhesive 18 to supply the adhesive to the transfer roller 35a, a current collecting body feed roller 35c arranged so as to be opposed to the transfer roller 35a, and a sheet feed roller 35d. The current collecting body 19 is sent out by rotating the transfer roller 35a and the current collecting body feed roller 35c, and one face of the current collecting body 19 is coated with the adhesive 18 by the transfer roller 35a. Subsequently, the sheet 8 for an electrode supplied by the sheet feed roller 35d is stuck to one face of the current collecting body 19 through the adhesive 18. Thus, the electrode body sheet 10 is obtained. In the electrode body sheet 10 shown in FIG. 2A, the sheet 8 for an electrode is stuck to only one face of the current collecting body 19. However, the electrode body sheet 10 having the activated carbon powder 1 arranged on both faces of the current collecting body 19 is obtained by again performing this process ST5 and sticking the sheets 8, 8 for an electrode onto both the faces of the current collecting body 19.

Next, in the continuous drying process ST6 shown in FIG. 2B, the IPA3 included within the electrode body sheet is heated and removed by introducing the electrode body sheet 10 obtained by the current collecting body adhering process ST5 into a continuous heating furnace 36 and heating this electrode body sheet 10. The continuous heating furnace 36 is constructed by a conveying path 36a for passing the electrode body sheet 10 therethrough, and a pair of heaters 36b, 36b opposed to each other through the conveying path 36a. The heaters 36b, 36b are arranged along the conveying direction of the conveying path 36a. Various kinds of drying systems can be adopted in the heaters 36b, 36b. For example, drying systems using warm air drying, far infrared drying, dielectric heating, etc. can be adopted. Further, a system for evaporating a predetermined substance by arranging the electrode body sheet 10 under a reduced pressure atmosphere can be also adopted in a certain case. However, in the case of each drying system, it is preferable that the electrode body sheet 10 can be heated until a temperature higher than the boiling point of the organic solvent (IPA3) for lubrication. For example, it is preferable that the electrode body sheet 10 can be heated to about 150° C. so as to heat and remove the IPA3.

To dry the electrode body sheet 10, the electrode body sheet 10 is conveyed from the upstream side of the conveying path of the continuous heating furnace 36, and passes between the pair of heaters 36b, 36b and is heated.

A large part of the IPA3 included in the electrode body sheet 10 is heated and removed by the continuous drying process ST6, and only one portion is left in the electrode body sheet 10 as the remaining IPA. Further, further only one portion of the remaining IPA is changed into diisopropylether (hereinafter described as DIPE) on the activated carbon powder surface by this continuous drying process ST6, and this DIPE is also left in the electrode body sheet 10. In the subsequent present specification, "the remaining IPA" and the "DIPE" are generally called an "organic chemical compound".

As shown in FIG. 2C, an electrode body 12 constructed by sticking the polarizing property electrode 11 onto both the faces of the current collecting body 19 is then obtained by cutting the electrode body sheet 10 to a predetermined length after the continuous drying.

As shown in FIG. 2B, the electrode body sheet 10 supplied in the continuous drying process ST6 is conveyed within the continuous heating furnace 36 in a state in which the electrode body sheet 10 is widened approximately in a plane shape. Accordingly, the organic chemical compound can be efficiently removed from both the faces of the electrode body sheet 10. Namely, if the winding body after the winding process ST7 described later is performed is dried and the organic substance is removed from the polarizing property electrode 11, the organic chemical compound, etc. evaporated from the electrode 11 surface easily stays inside the winding body. Therefore, there is a fear that the organic chemical compound is insufficiently removed from the polarizing property electrode 11. In contrast to this, if the organic chemical compound is removed in a state in which the electrode body sheet 10 manufactured in the current collecting body adhering process is widened as in the manufacturing method in this embodiment mode, the evaporated object of the above organic chemical compound does not stay in the vicinity of the surface of the electrode body sheet 10, but is scattered. As a result, the contained organic chemical compound of the polarizing property electrode 11 can be efficiently removed.

Further, since the electrode body sheet 10 is processed in the state widened in the plane shape in the continuous drying process ST6, it is preferable to continuously perform the current collecting body adhering process ST5 and the continuous drying process ST6 in the manufacturing method in the present invention. Namely, in the current collecting body adhering process ST5, the manufactured electrode body sheet is formed in the plane shape in the nature of this process. Accordingly, the process can be efficiently performed by transferring the process to the continuous drying process ST6 while this state is held. Further, the adhesive 18 adhering the current collecting body 19 and the sheets 8, 8 for an electrode can be also dried and solidified by the continuous drying process ST6 so that the electrode can be also efficiently manufactured in this respect.

Next, FIGS. 3A to 3D show the winding process ST7, the vacuum drying process ST8 and the liquid injecting process ST9.

Figure 3B:
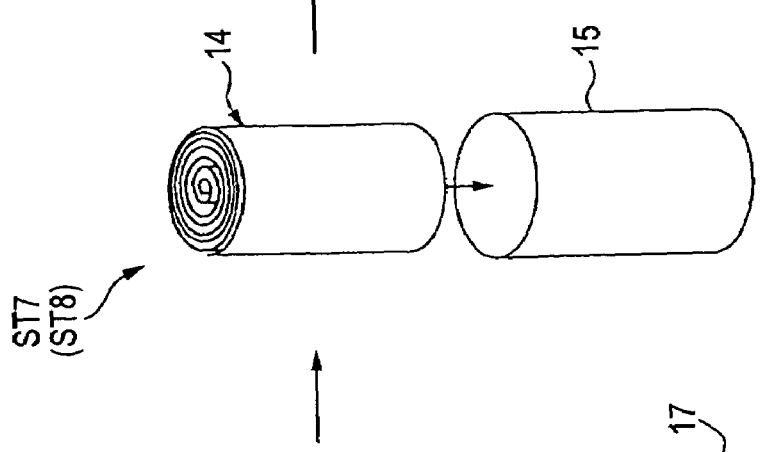

In the winding process ST7 shown in FIGS. 3A and 3B, an electrode body 12 (polarizing property electrode 11) and a separator 13 are overlapped and wound so that a winding body 14 is obtained. Namely, as shown in FIG. 3A, the separator 13 is arranged between the pair of electrode bodies 12, 12. Subsequently, as shown in FIG. 3B, the electrode bodies 12, 12 and the separator 13 are simultaneously wound and set to the winding body 14.

This winding process ST7 is performed within the atmosphere of a series of manufacturing processes of the electrical double layer capacitor. Therefore, there is a case in which an electrolyte component (e.g., propylene carbonate (hereinafter described as PC)), acetone, alcohol, etc. volatilized within such an atmosphere are re-adsorbed to the activated carbon powder of the polarizing property electrode 11. In the subsequent present specification, these re-adsorbed volatilized components and the above remaining IPA and DIPE are anew generally called an "organic chemical compound".

Figure 3C:
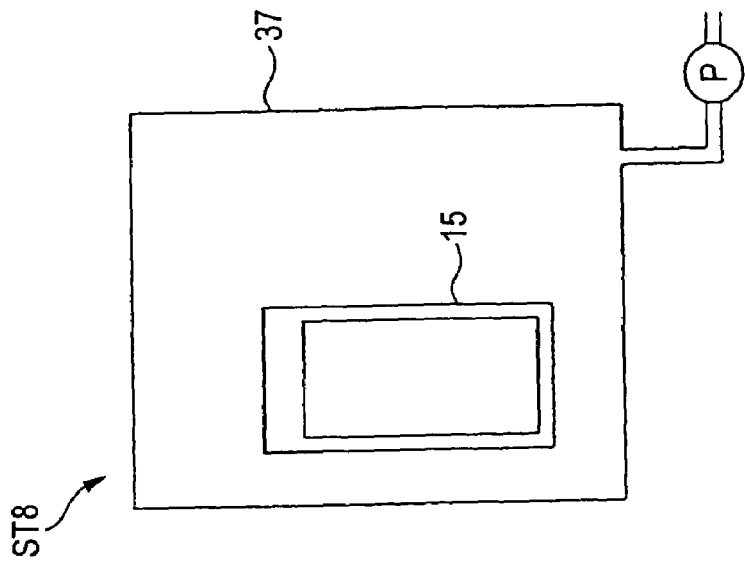

Next, in the vacuum drying process ST8 shown in FIGS. 3B and 3C, the winding body 14 obtained in the winding process ST7 is inserted into a capacitor container 15. Thereafter, the organic chemical compound left within the winding body 14 (polarizing property electrode 11) is preferably removed by the vacuum drying until the organic chemical compound has a concentration of 300 ppm or less (with respect to the weight of the sheet for an electrode).

Namely, as shown in FIG. 3B, the winding body 14 is inserted into the capacitor container 15 of a hollow cylindrical shape manufactured by a metal. Thereafter, as shown in FIG. 3C, the entire capacitor container 15 including the winding body 14 is arranged within a vacuum drier 37. Then, the winding body 14 (polarizing property electrode 11) is dried under vacuum at a temperature of 120° C. or more and 200° C. or less at a pressure of $10^{-1}$ Pa or less. The organic chemical compound left in the polarizing property electrode 11 is removed by this vacuum drying until the organic chemical compound has a concentration in the range of preferably 300 ppm or less (with respect to the weight of the sheet for an electrode), more preferably 150 ppm or more (with respect to the weight of the sheet for an electrode) and 300 ppm or less (with respect to the weight of the sheet for an electrode). Namely, the organic chemical compound is removed by the vacuum drying until the total amount of a re-adsorbing component such as PC, acetone, alcohol, etc., the remaining IPA and DIPE is 300 ppm or less (with respect to the weight of the sheet for an electrode) in concentration.

When the concentration of the organic chemical compound exceeds 300 ppm (with respect to the weight of the sheet for an electrode), the formation of the electrical double layer using the adsorption of electrolytic ions is prevented and the diffusion resistance between the activated carbon powder 1 and the electrolyte is increased. Therefore, electrode performance as the polarizing property electrode 11 for the electrical double layer capacitor is reduced so that this concentration is not preferable. It is most preferable that the concentration of the organic chemical compound is 0 ppm (with respect to the weight of the sheet for an electrode). However, in reality, it is difficult to reduce the concentration until a concentration less than 150 ppm (with respect to the weight of the sheet for an electrode) due to high adsorbing force of the activated carbon in view of cost and thermal deterioration of the electrode. If the concentration of the organic chemical compound lies in the range of 150 to 300 ppm (with respect to the weight of the sheet for an electrode), no formation of the electrical double layer is greatly prevented. Therefore, there is no fear that the diffusion resistance between the activated carbon powder and the electrolyte becomes excessive and the electrode performance is greatly reduced.

In particular, in the polarizing property electrode 11 in this embodiment mode, the content of the organic chemical compound is reduced until 800 ppm or less (with respect to the weight of the sheet for an electrode) by the above electrode drying process ST6. Accordingly, the organic chemical compound can be more efficiently removed by the vacuum drying process ST8. Namely, the organic chemical compound can be removed for a short time until a predetermined content, preferably 300 ppm or less (with respect to the weight of the sheet for an electrode).

Figure 3D:
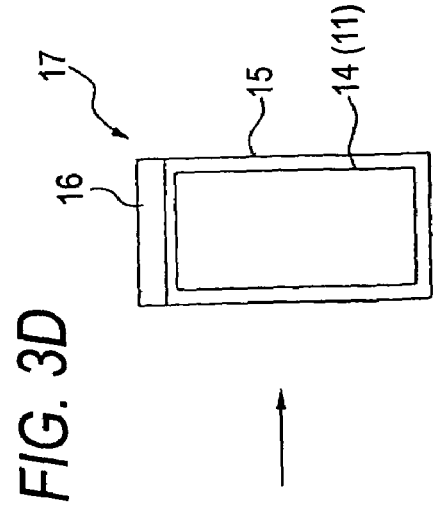

Finally, in the liquid injecting process ST9 shown in FIG. 3D, the electrolyte is injected from a nozzle 38 and a sealing port body 16 is further joined to the capacitor container 15 by welding, etc. Thus, the electrical double layer capacitor 17 is obtained. A liquid obtained by dissolving quaternary ammonium salt in the PC can be used as the electrolyte.

The above polarizing property electrode 11 for the electrical double layer capacitor is constructed by mixing the PTFE2 with the activated carbon powder 1. In a state after the above continuous drying process ST6 is performed, the concentration of the organic chemical compound such as the remaining IPA, DIPE, PC, acetone, alcohol kinds, etc. included within this polarizing property electrode 11 becomes 800 ppm or less (with respect to the weight of the sheet for an electrode). Then, in a state after the vacuum drying process ST8 is performed, the concentration of the organic chemical compound preferably becomes a low level of 300 ppm or less (with respect to the weight of the sheet for an electrode). Accordingly, in accordance with this polarizing property electrode 11, the organic chemical compound amount left within the minute hole of the activated carbon powder is reduced, and there is no fear that the formation of the electrical double layer using the adsorption of the electrolytic ion is prevented. Thus, the electrical double layer is sufficiently formed within the minute hole of the activated carbon powder, and the diffusion resistance between the activated carbon powder and the electrolyte can be reduced.

When the concentration of the organic chemical compound included in the above polarizing property electrode 11 exceeds 800 ppm (with respect to the weight of the sheet for an electrode) in the state after the continuous drying process ST6 is performed, no organic chemical compound of the electrode can be sufficiently removed even when it is intended to remove the organic chemical compound of the electrode by heating and pressure reduction in the manufacturing case of the electrical double layer capacitor using such a polarizing property electrode 11. Otherwise, much time is required to sufficiently remove the organic chemical compound. Accordingly, this concentration is not preferable.

It is most preferable that the concentration of the organic chemical compound of the polarizing property electrode 11 in the state after the vacuum drying process ST8 is performed, is 0 ppm (with respect to the weight of the sheet for an electrode). However, in reality, it is difficult to reduce this concentration until a concentration less than 150 ppm (with respect to the weight of the sheet for an electrode) due to the high adsorbing force of the activated carbon. Accordingly, if the concentration of the organic chemical compound lies in the range of 150 to 300 ppm (with respect to the weight of the sheet for an electrode), no formation of the electrical double layer is greatly prevented and there is no fear that the diffusion resistance between the activated carbon powder and the electrolyte is excessive and the electrode performance is greatly reduced.

Further, in accordance with the above manufacturing method of the electrical double layer capacitor, the organic chemical compound such as the remaining IPA, DIPE, etc. unable to be sufficiently removed in the continuous drying process ST6 is removed until the organic chemical compound preferably has a concentration of 300 ppm or less (with respect to the weight of the sheet for an electrode) by the vacuum drying process ST8. Accordingly, the organic chemical compound amount left within the minute hole of the activated carbon powder can be reduced. Accordingly, there is no fear that the formation of the electrical double layer using the adsorption of the electrolytic ion with respect to the activated carbon powder is prevented. Thus, the electrical double layer is sufficiently formed within the minute hole of the activated carbon powder, and the polarizing property electrode 11 having small diffusion resistance between the activated carbon powder and the electrolyte is obtained. Accordingly, the electrical double layer capacitor of high performance can be obtained. Further, the above manufacturing method of the electrical double layer capacitor 17 has the advantage that there is no fear that the moisture and the organic chemical compound included within the atmosphere of a series of manufacturing processes are re-adsorbed to the polarizing property electrode 11 since the vacuum drying process ST8 is arranged just before the liquid injecting process ST9.

First Embodiment (Manufacture of Electrical Double Layer Capacitor of Embodiment 1)

First, the activated carbon powder is manufactured as follows. First, carbonization processing is performed by holding phenol resin within a nitrogen atmosphere at 900° C. for two hours. Next, when the obtained raw material carbon is again raised in temperature within the nitrogen current and reached 800° C., a nitrogen mixing gas including water vapor at 5% and carbon dioxide at 5% is circulated and held at 900° C. for two hours so that activation processing is performed. The obtained activated carbon is crushed by a ball mill crusher until the activated carbon had an average grain diameter of about 2 to 15 μm, and is set to activated carbon powder.

Next, an electrode molding process for kneading and molding the obtained activated carbon powder, a binding material (polytetrafluoroethylene) and an organic solvent for lubrication (isopropyl alcohol (IPA)) in a sheet shape is performed. Namely, 8 parts of polytetrafluoroethylene powder (e.g., Teflon 6J (registered trademark) manufactured by DUPONT-MITSUI FLUOROCHEMICALS CO., LTD.) by weight and 8 parts of acetylene black (e.g., Denkablack (registered trademark) manufactured by Denki-Kagaku Kogyo Co., Ltd.) by weight are mixed into 84 parts of the obtained activated carbon powder by weight. 8 parts of the IPA by weight is further added to this mixture and is mixed (raw material mixing process). Further, pressurization kneading is performed for 8 minutes by a biaxial kneader (kneading process). Thus, the polytetrafluoroethylene is fibrillated and set to a lump-shaped object. This lump-shaped object is crushed by a shearing type crusher so that a granular object having an average grain diameter of about 1 mm is obtained (crushing process). A sheet is formed by using the obtained granular object and is further rolled so that a long sheet for an electrode having 110 mm in width is obtained (sheet-forming and rolling process).

Next, both the faces of an aluminum foil (current collecting body) of 115 mm in width are coated with an adhesive (e.g., G-5780A manufactured by Notape Industry Co., Ltd.), and the above obtained sheet for an electrode is then stuck to both the faces of the current collecting body so that the electrode body sheet is obtained (current collecting body adhering process).

Next, the obtained electrode body sheet is dried in a state widened in a plane shape (electrode drying process). The electrode body sheet is dried by blowing the drying air of 150° C. against the electrode body sheet from both the faces of the sheet for 30 minutes at a flow rate of 3 liter/minute in a state in which the electrode body sheet is conveyed in one direction.

Next, the electrode body sheet is cut to a length of 1200 mm and is set to an electrode body and two electrode bodies are prepared. Next, a separator manufactured by rayon and having 50 μm in thickness is nipped between the two electrode bodies. The electrode bodies and the separator are wound in a spiral shape and are set to a winding body (winding process). The obtained winding body is inserted into a capacity container of a hollow cylindrical type having 50 mm in inside diameter and 130 mm in height.

Next, the capacity container storing the winding body thereinto is put into a vacuum drier, and the vacuum drying is performed in a condition of $10^{-1}$ Pa in pressure, 160° C. in temperature and 24 drying hours (vacuum drying process).

Then, an electrolyte obtained by dissolving quaternary ammonium salt (composition: triethylmethyl ammonium tetrafluoroborate) in PC at a concentration of 1.8 mol/L is prepared and is injected into the capacity container after the vacuum drying (liquid injecting process). Further, the capacity container is sealed by a sealing port body so that the electrical double layer capacitor of Embodiment 1 is manufactured.

(Manufacture of Electrical Double Layer Capacitor of Comparison Example 1)

The electrical double layer capacitor of Comparison Example 1 is manufactured by performing only the vacuum drying process without performing the electrode drying process. The drying time in the vacuum drying process is set to 24 hours.

(Manufacture of Electrical Double Layer Capacitor of Comparison Example 2)

Comparison Example 2 is similar to the above Comparison Example 1 except that the drying time in the vacuum drying process is set to 48 hours. Thus, the electrical double layer capacitor of the Comparison Example 2 is manufactured.

(Characteristic Test of Electrical Double Layer Capacitor)

Aging processing is performed at 60° C. with respect to the electrical double layer capacitors of the above Embodiment 1 and the Comparison Examples 1, 2. Thereafter, the initial resistance value of an internal resistor is measured. The capacitor is charged until a terminal voltage became 2.5 V under a charging electric current of 30 A. While the terminal voltage is maintained at 2.5 V, the capacitor is left at 45° C. for 1000 hours and the resistance value is then measured. Then, the raising ratio of the resistance value is calculated from the initial time to the 1000 hours. In this case, the initial resistance value is set to 1. The results are shown in Table 1.

As shown in Table 1, with respect to the electrical double layer capacitor of the Embodiment 1 performing the continuous drying process and the vacuum drying process, the initial resistance value is low and the resistance raising ratio is greatly improved in comparison with the electrical double layer capacitor of the Comparison Example 1 performing only the vacuum drying process for 24 hours. Further, both the initial resistance value and the resistance raising ratio are also excellent in comparison with the electrical double layer capacitor of the Comparison Example 2 performing only the vacuum drying process for 48 hours.

TABLE 1

|  | initial resistance value ($\Omega \cdot cm^2$) | resistance raising ratio after durability test (times) |
|---|---|---|
| Embodiment 1 | 6.4 | 1.35 |
| Comparison Example 1 | 8 | 2.5 |
| Comparison Example 2 | 7.3 | 1.45 |

(Analysis of Organic Chemical Compound Amount within Polarizing Property Electrode)

The organic chemical compound is analyzed by using a gas chromatograph with respect to the electrical double layer capacitors of the Embodiment 1 and the Comparison Examples 1, 2. The analyzed results of the polarizing property electrode of each sample are shown in Table 2.

The analysis using the gas chromatograph is made as follows. Namely, a sample tube of a heat attaching-detaching device of ATD400 manufactured by Perkin-Elmer corporation is filled with one portion of the polarizing property electrode after the vacuum drying. This one portion of the polarizing property electrode is heated at 350° C. for 10 minutes while a helium gas is flowed. Then, an evaporated component is caught and collected in an internal trap and is introduced into a gas chromatograph device. A column used in the gas chromatograph is SPB-1 (60 mm in length, 0.25 mm in inside diameter and 25 μm in film thickness) manufactured by Spelco corporation. A hydrogen flame detector (FID) is used as a detector and quantitative determination is calibrated by the strength of pentene. Further, it is supposed that peak strength using the FID is proportional to a carbon number. Qualification of each peak is performed by mass analysis.

As shown in Table 2, the main detected organic chemical compounds are isopropyl alcohol (IPA), diisopropyl ether (DIPE), propylene and isopropyl acetate. It is considered that the DIPE, propylene and isopropyl acetate are chemical compounds generated by oxidizing and dehydrating and condensing the isopropyl alcohol used in an organic solvent for kneading, etc. in the continuous drying process and the vacuum drying process. As shown in Table 2, it can be understood that each organic chemical compound amount in the polarizing property electrode of the Embodiment 1 performing the continuous drying and the vacuum drying is sequentially reduced in comparison with the polarizing property electrodes of the Comparison Examples 1, 2 performing only the vacuum drying process. Namely, by-products such as DIPE, propylene, etc. generated in the subsequent vacuum drying can be reduced by removing the organic chemical compound until 800 ppm or less with respect to the weight of the sheet for an electrode in the continuous drying process. Thus, the manufacturing method in the present invention is very useful to remove the organic chemical compound included in the polarizing property electrode.

TABLE 2

| detected component | Embodiment 1 | Comparison Example 1 | Comparison Example 2 |
|---|---|---|---|
| isopropyl alcohol | 67 | 265 | 96 |
| diisopropyl ether | 28 | 137 | 154 |

TABLE 2-continued

| detected component | Embodiment 1 | Comparison Example 1 | Comparison Example 2 |
|---|---|---|---|
| propylene | 37 | 89 | 79 |
| isopropyl acetate | 30 | 73 | 66 |

Thus, it can be understood that the initial resistance value of the capacitor and the resistance raising ratio after 1000 hours can be greatly reduced by introducing the continuous drying process for drying the electrode body sheet in the state widened in the plane shape in the manufacture of the polarizing property electrode, and its effects are sufficiently obtained even when the vacuum drying process is shortened.

It is considered that this is because the organic chemical compound amount left in the polarizing property electrode is reduced and the electrical double layer is sufficiently formed within the minute hole of the activated carbon powder and the diffusion resistance between the activated carbon powder and the electrolyte is reduced.

Second Embodiment (Manufacture of Electrical Double Layer. Capacitor of Embodiment 2)

Similar to the case of the above Embodiment 1, the electrical double layer capacitor of Embodiment 2 is manufactured except that the electrode body sheet after the current collecting body adhering process is introduced into the continuous drying furnace of a hot air type, and the continuous drying (continuous drying process) is performed in the condition of blowing the hot air of 150° C. in temperature for four minutes at a flow rate of 10 L/minute, and the drying time in the vacuum drying process is set to 48 hours.

(Analysis of Organic Chemical Compound Amount within Polarizing Property Electrode)

With respect to the Embodiment 2 and the Comparison Example 2 made in the above First Embodiment, one portion of the polarizing property electrode after the vacuum drying process is picked and heated for 60 minutes at 300° C. within a nitrogen gas current so that moisture within the electrode is set to water vapor. The moisture amount is then measured by introducing this water vapor into a Karl Fischer measuring device. Further, the organic chemical compound is analyzed by using the gas chromatograph in a method similar to that in the above First Embodiment. Table 3 shows the analyzed results of the polarizing property electrodes of the Embodiment 2 and the Comparison Example 2. The unit of numerical values in Table 3 is set to ppm (with respect to the weight of the sheet for an electrode).

Further, with respect to the Embodiment 2 and the Comparison Example 2, similar to the First Embodiment, the initial resistance value and the resistance raising ratio are measured. Table 4 shows the measured results.

TABLE 3

| | before sheet shape drying | after sheet shape drying | before vacuum drying | after vacuum drying |
|---|---|---|---|---|
| isopropyl alcohol | 15000 | 440 | 436 | 67 |
| diisopropyl ether | 0 | 12 | 12 | 28 |
| propylene | 0 | 15 | 14 | 30 |
| isopropyl acetate | 0 | 16 | 17 | 37 |
| ethanol | 120 | 25 | 86 | 13 |
| acetone | 357 | 72 | 170 | 59 |
| acetaldehyde | 12 | 45 | 65 | 10 |

TABLE 4

| | initial resistance value ($\Omega \cdot cm^2$) | resistance raising ratio (times) |
|---|---|---|
| Embodiment 2 | 6.1 | 1.23 |
| Comparison Example 2 | 7.3 | 1.45 |

As shown in Table 3, the main detected organic chemical compounds are isopropyl alcohol (IPA), diisopropyl ether (DIPE), propylene, isopropyl acetate, ethanol, acetone and acetaldehyde. It is considered that the DIPE, propylene and isopropyl acetate are chemical compounds generated by oxidizing and dehydrating and condensing the isopropyl alcohol used in an organic solvent for kneading, etc. in the continuous drying process and the vacuum drying process. It is also considered that ethanol and acetone are components adsorbed into the activated carbon from the atmosphere of a manufacturing process of the capacitor. It is further considered that acetaldehyde is generated by oxidizing ethanol.

As shown in Table 3, it is understood that each organic chemical compound is sequentially reduced by performing the continuous drying and the vacuum drying.

Further, as shown in Table 4, the initial resistance value and the resistance raising ratio of the capacitor of the Embodiment 2 are reduced in comparison with the Comparison Example 2. From the comparison with the characteristics of the Embodiment 1 shown in Table 1, it is possible to obtain the removing effect of the organic chemical compound by introducing the continuous drying process even when the drying in the continuous drying process is comparatively slowly performed. Further, it is understood that the electrical double layer capacitor of excellent characteristics having a low initial resistance value and a small resistance raising ratio is obtained.

Figure 4:
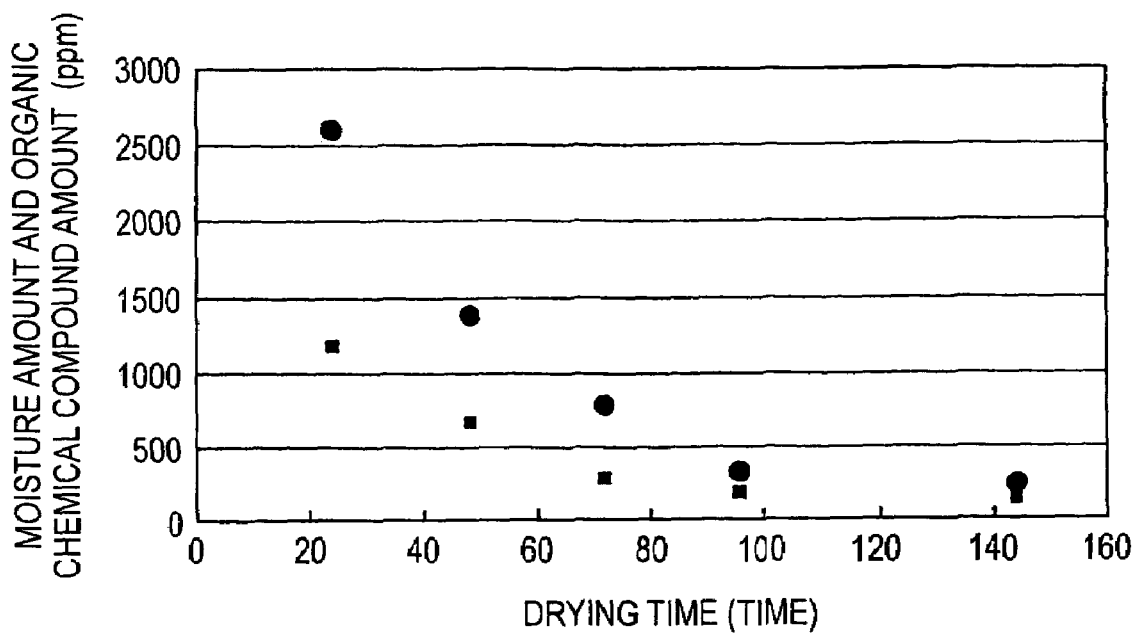
FIG. 4 is a graph showing the relation of the total amount of an organic chemical compound and moisture included in a polarizing property electrode after a vacuum drying process, and a drying time of the vacuum drying when no continuous drying process is performed.

Further, similar to the Comparison Example 2 except that the drying time in the vacuum drying process is set to 24, 78, 96 and 144 hours, the polarizing property electrode is manufactured and the total amount of the organic chemical compound and the moisture included in this polarizing property electrode is analyzed. FIG. 4 shows vacuum drying time dependence of the total amount of the organic chemical compound and the moisture included in the polarizing property electrode after the vacuum drying process when no continuous drying process is performed.

Figure 5:
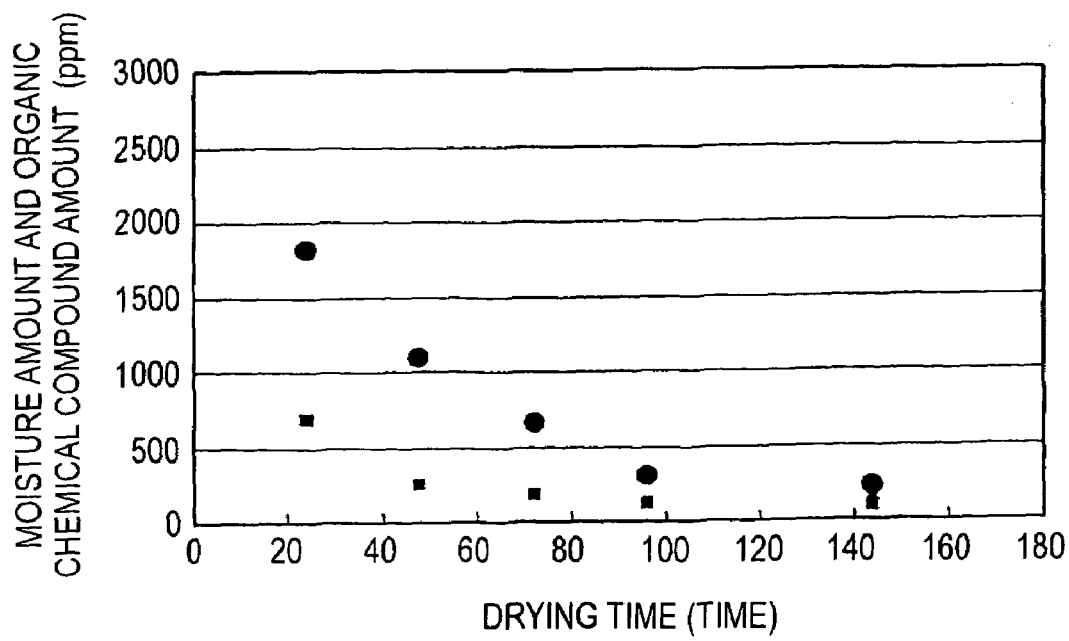
FIG. 5 is a graph showing the relation of the total amount of the organic chemical compound and the moisture included in the polarizing property electrode after the vacuum drying process, and the drying time of the vacuum drying when the continuous drying process is performed.

Similar to the Embodiment 2 except that the drying time in the vacuum drying process is set to 24, 78, 96 and 144 hours, the polarizing property electrode is manufactured and the total amount of the organic chemical compound and the moisture included in this polarizing property electrode is analyzed. FIG. 5 shows vacuum drying time dependence of the total amount of the organic chemical compound and the moisture included in the polarizing property electrode after the vacuum drying process when the continuous drying process is performed.

With respect to the moisture, as shown in FIG. 5, when the continuous drying process is performed, the moisture amount becomes 1500 ppm or less (with respect to the weight of the sheet for an electrode) in the vacuum drying of 48 hours. In contrast to this, as shown in FIG. 4, even when no continuous drying process is performed, the moisture amount becomes 1500 ppm or less (with respect to the weight of the sheet for an electrode) in the vacuum drying of 48 hours. Further, when the curves of the moisture amount in FIGS. 5 and 4 are compared, it is clearly understood that the curve in the performing case of the continuous drying process of FIG. 5 is entirely lower than the curve of FIG. 4. Accordingly, it is understood that the vacuum drying time in the performing case of the continuous drying process can be shortened in comparison with the case that no continuous drying process is performed.

With respect to the organic chemical compound, as shown in FIG. 5, when the continuous drying process is performed, the organic chemical compound amount becomes 300 ppm or less (with respect to the weight of the sheet for an electrode) after the vacuum drying of 48 hours. In contrast to this, as shown in FIG. 4, when no continuous drying process is performed, the organic chemical compound amount becomes 300 ppm or less (with respect to the weight of the sheet for an electrode) after the vacuum drying of 72 hours. Thus, it is understood that the vacuum drying time can be shortened when the continuous drying process is performed.

As mentioned above in detail, in accordance with the manufacturing method of the polarizing property electrode of the present invention, in the electrode drying process after an electrode molding process, the organic chemical compound is removed from the sheet for an electrode in a state in which the sheet for an electrode is widened approximately in a plane shape. Accordingly, the removing efficiency of the organic substance from the polarizing property electrode is improved. As a result, the electrical double layer is sufficiently formed within the minute hole of the activated carbon powder, and the polarizing property electrode having small diffusion resistance between the activated carbon powder and the electrolyte can be obtained.

Further, if the organic chemical compound is removed by the electrode drying process until the organic chemical compound has a concentration of 800 ppm or less (with respect to the weight of the sheet for an electrode), the containing ratio of the organic chemical compound of the polarizing property electrode can be reduced. The containing ratio of the organic chemical compound of the polarizing property electrode can be further reduced in the manufacture of the electrical double layer capacitor using such a polarizing property electrode. Concretely, the generation of the DIPE, propylene, etc. in the subsequent vacuum drying process can be restrained. Thus, the electrical double layer is sufficiently formed within the minute hole of the activated carbon powder, and the polarizing property electrode having small diffusion resistance between the activated carbon powder and the electrolyte can be obtained.

Further, in accordance with the polarizing property electrode for the electrical double layer capacitor in the present invention, since the containing ratio of the organic chemical compound of the polarizing property electrode is 800 ppm or less (with respect to the weight of the sheet for an electrode), there is no fear that the formation of the electrical double layer using the adsorption of an electrolytic ion is prevented by the organic chemical compound left in the electrode. Further, the electrical double layer is sufficiently formed within the minute hole of the activated carbon powder, and the diffusion resistance between the activated carbon powder and the electrolyte is reduced. Thus, the electrical double layer capacitor having small internal resistance and large electrostatic capacity can be obtained.

Still further, one embodiment of the present invention will next be explained on the basis of the drawings.

Figure 6:
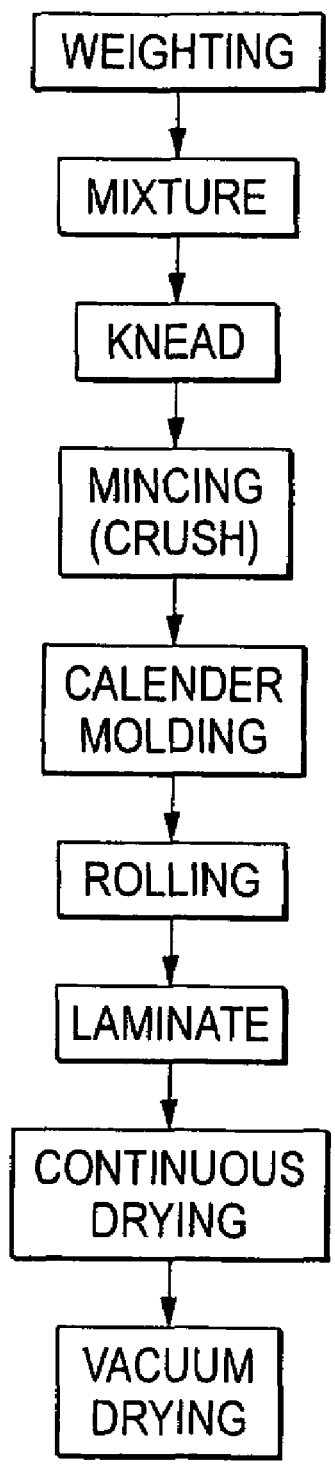
FIG. 6 is a view showing a manufacturing method of an electrode sheet for an electrical double layer capacitor in one embodiment mode of the present invention.

FIG. 6 shows a manufacture process in manufacturing an electrode sheet for an electrical double layer capacitor (hereinafter called an electrode sheet). A raw material for manufacturing a sheet-shaped electrode constituting the electrode sheet is activated carbon as carbonaceous powder, carbon black as an electrically conductive assistant, powder of PTFE (polytetra fluoroethylene) as a binder, and IPA (isopropyl alcohol) of a liquid shape as an assistant for the binder.

The weight of each raw material is first measured. Next, the activated carbon and the carbon black are put into the container of a mixer and are mixed by a rotating agitating blade. Thus, the activated carbon and the carbon black are uniformly mixed as much as possible.

Then, the PTFE and the IPA are put into the container of the above mixer, and the PTFE, the IPA and the above mixture of the activated carbon and the carbon black are mixed. Thus, the activated carbon, the carbon black and the PTFE are mixed and the PTFE is changed into fibers so that the activated carbon and the carbon black are entwined.

Next, this mixed mixture is stored into the container of a kneader and is covered with a cover. The mixture is kneaded by rotating the blade while the mixture is pressurized by this cover. The mixture is kneaded in a clay shape by this kneading, and the PTFE is further changed into fibers so that the activated carbon and the carbon black are bound. At this time, the temperatures of the container of the kneader, the cover and the blade are controlled so as to be e.g., 90° C.

Next, the kneaded object kneaded by the above kneader is stored into the container of a crusher 9 and is changed into fine grains. Thereafter, the kneaded object is put into a calender molding machine and is molded in a sheet shape by two rollers. The molded sheet-shaped molding body is wound by a winding roller. At this time, the thickness of the sheet-shaped molding body is set to e.g., 200 μm.

Next, in a rolling process, the above sheet-shaped molding body passes between two rollers and is rolled. The sheet-shaped electrode having a predetermined thickness, e.g., 160 μm is formed by performing this rolling process plural times. In the final process of this rolling, both end portions of the sheet-shaped electrode in its width direction are cut by a cutter. The above-mentioned process becomes a process for forming the sheet-shaped electrode.

Next, in a laminate process, the above rolled sheet-shaped electrode is stuck to an aluminum foil as a current collecting foil so that an electrode sheet is formed. This process is a process for making the electrode sheet. Then, a drying process constructed by continuous drying and vacuum drying is executed with respect to the electrode sheet of this roll shape.

Figure 8:
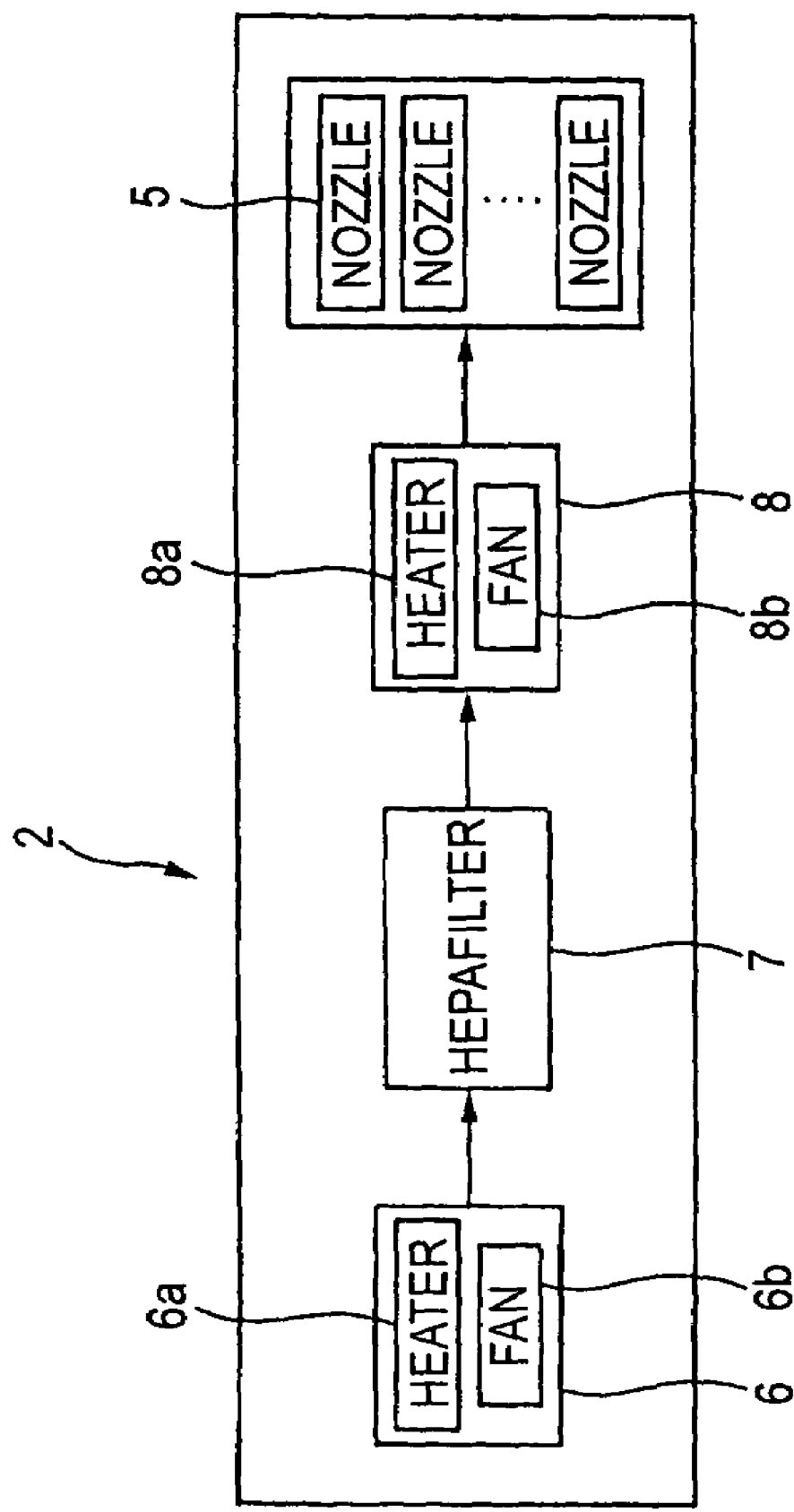
FIG. 8 is a block diagram showing the supply flow of a heating wind within the drawing room.
Figure 9:
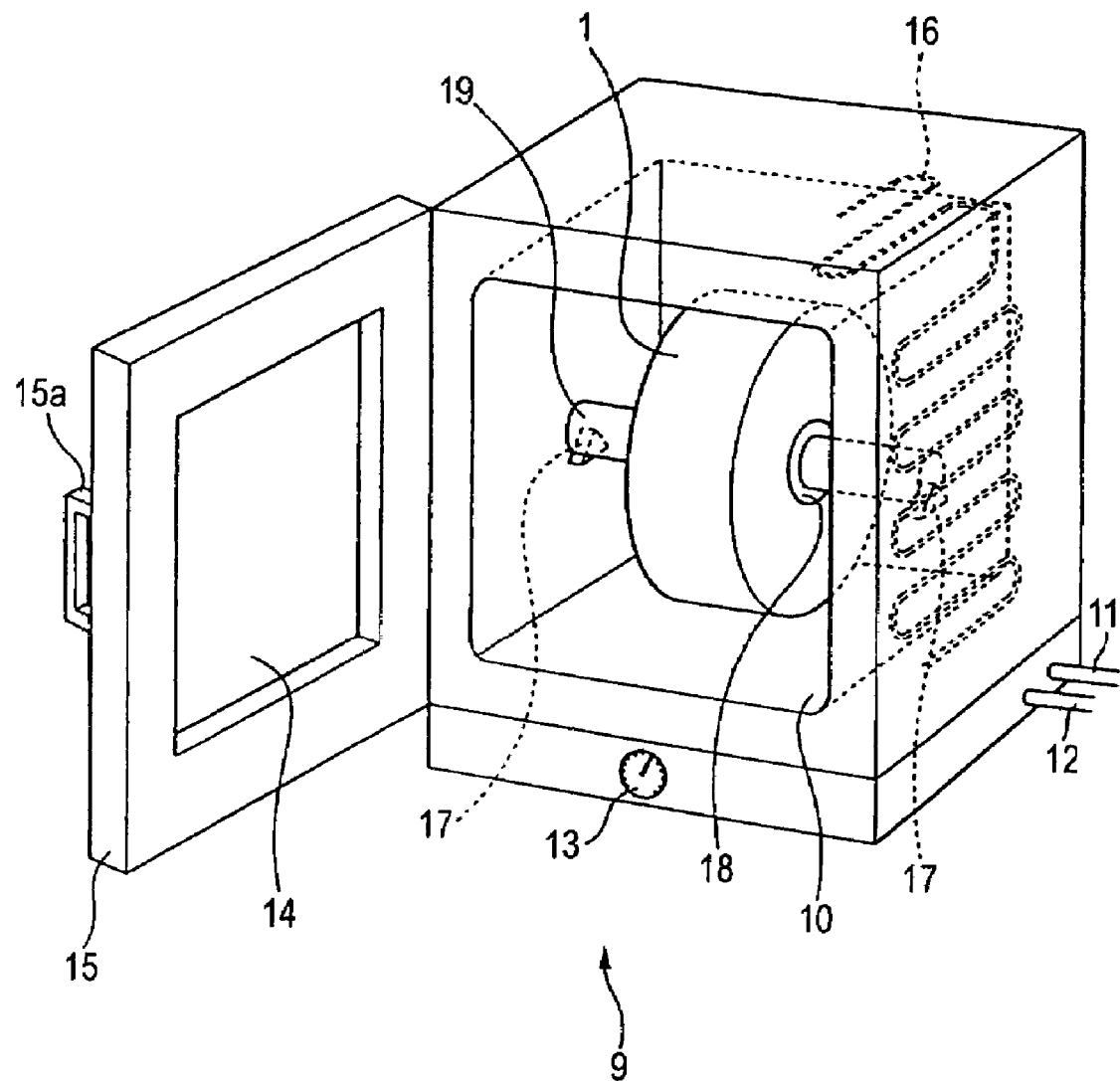
FIG. 9 is a perspective view showing a vacuum room.

Here, the details of the continuous drying and the vacuum drying in the above drying process will be explained by using FIGS. 7 to 9.

Figure 7:
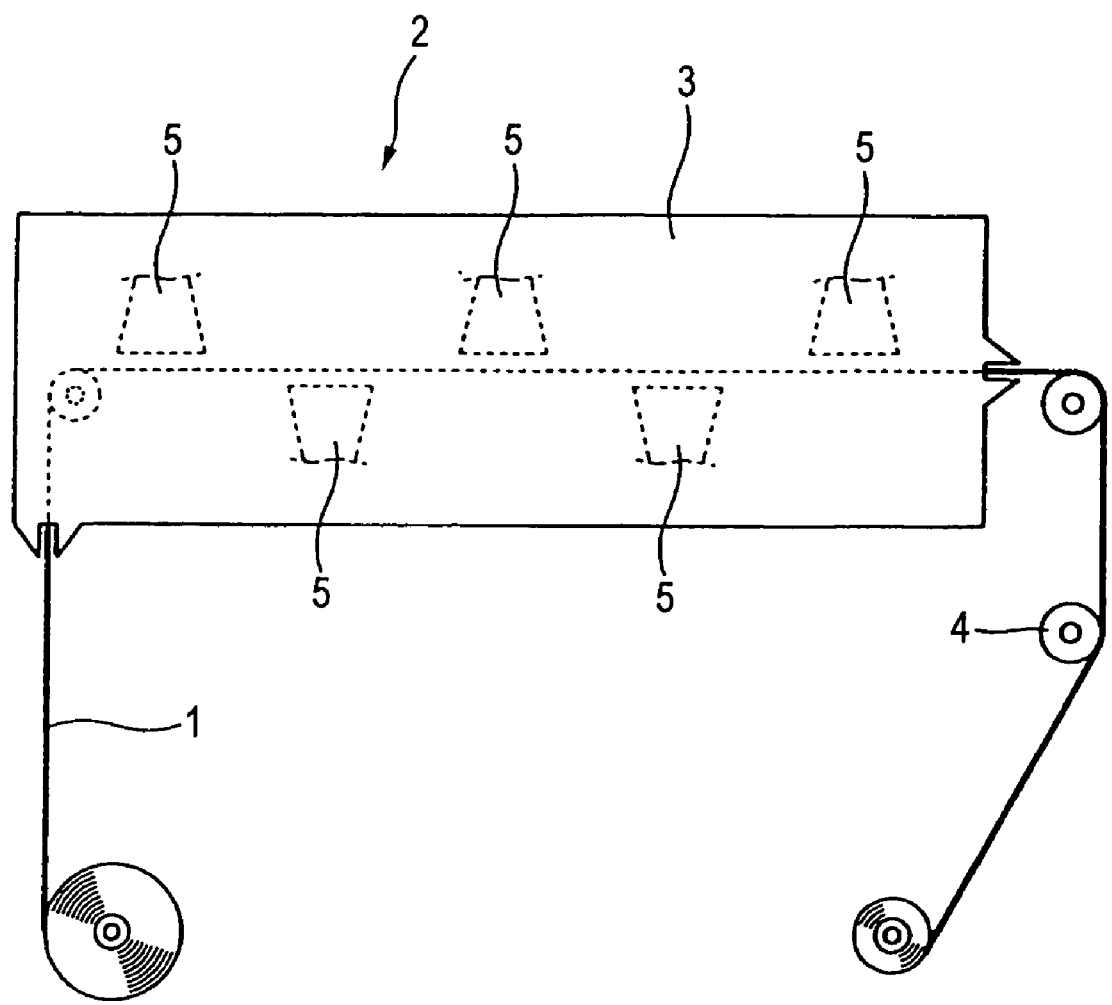
FIG. 7 is a side view showing a drying room.

First, in the continuous drying, as shown in FIG. 7, while the electrode sheet 101 wound in the roll shape is drawn out of one roller in a continuous drier 102 of the electrode sheet 101, the electrode sheet 101 is dried by passing the electrode sheet 101 through a drying room 103. This dried electrode sheet 101 is wound by another roller and is again formed in the roll shape.

In this case, the roller drawing-out the electrode sheet 101 performs tension control for applying brake force according to the roll diameter (wound thickness) of the electrode sheet 101. Further, in a roller 104 arranged by one stage before the roller again winding the dried electrode sheet 101 therearound, edge control for displacing the electrode sheet 101 in the width direction is performed such that the tensile force of the electrode sheet 101 is constant in each portion in the width direction.

Plural nozzles 105 for blowing a heating wind against the continuously dried electrode sheet 101 from above and below are arranged within the above drying room 103. The number of nozzles 105 may be set to an arbitrary number if it is sufficient to dry the electrode sheet 101. As shown in FIG. 8, the heating wind is generated by a first heating wind supply means 106 having a heater 106a and a fan 106b. Then, the heating wind is sent to the nozzle 105 via a second heating wind supply means 108 having a heater 108a and a fan 108b through a hepafilter 107 (High Efficiency Particulate Airfilter).

The hepafilter 107 is a filter having ability in which a dust collecting area is improved by forming non-woven fabric of resin fibers in a frill shape and grains of 0.3 µm or more are caught and collected by 99.97%. Metallic powder within piping, deteriorating powder of the heater, etc. are removed from the heating wind passing through the hepafilter 107. However, the hepafilter 107 has high collecting ability so that density is very high. Therefore, the force of the heating wind is reduced by the resistance of the hepafilter 107. Further, heat capacity is high by the density of the hepafilter 107 and the temperature of the heating wind passing through the hepafilter 107 is lowered. Accordingly, in this embodiment, the heating wind passing through the hepafilter 107 is again increased in temperature and pressure by using the second heating wind supply means 108 and is blown against the electrode sheet 101 from the nozzle 105.

As mentioned above, the impurities of the air are very small in the heating wind passing through the hepafilter 107. Therefore, in this embodiment, piping connecting the second heating wind supply means 108 and the nozzle 105 is manufactured by corrosion-resisting stainless steel. Further, for example, a nichrome wire as the heater 108b is covered with a pipe manufactured by corrosion-resisting stainless steel. Thus, the generation of dust is prevented in each of the piping and the nichrome wire.

Therefore, the heating wind from the second heating wind supply means 108 has very small impurities, but the construction for generating the heating wind is not necessarily limited to this embodiment by the environment of the drying process.

Thus, the remaining amounts of the moisture and the IPA included in the electrode sheet 101 are effectively removed by the continuous drying performed by widening the electrode sheet 101.

For example, the temperature of the heating wind at the blowing time against the electrode sheet 101 is set to about 120° C. This is because the problem of deterioration of an adhesive, etc. is caused when the temperature of the heating wind is higher than this temperature.

There is no problem even when drying ability is raised within the drying room 103. The drying ability is raised by performing the drying operation while the electrode sheet 101 is meandered and repeatedly turned back. The drying ability is also raised by blowing the heating wind and simultaneously arranging a far infrared device, etc. within the drying room 103.

Further, a heater or piping covered with stainless steel, etc. may be also used to prevent the generation of dust in the electrode sheet 101 in the first heating wind supply means 106 as well as the heater of the above second heating wind supply means 108.

In the vacuum drying, the electrode sheet 101 wound in the roll shape after the continuous drying is stored into the vacuum room 110 of a vacuum drier 109 in the roll state as it is, and is dried.

The vacuum degree of the vacuum room 110 or the wind flow within the vacuum room is adjusted by a vacuum pipe 111 connected to an unillustrated vacuum pump, and a purge pipe 112. The vacuum degree can be measured by using a vacuum gage 113. A door 115 attaching an observing window 114 thereto seals the vacuum room 110 and is opened and closed by a handle 115a.

A heater 116 is arranged in the circumferential wall of the vacuum room 110, and the temperature within the vacuum room 110 is controlled by this heater 116. A core support 117 is arranged on the inner wall face of the vacuum room 110. A core 119 inserted into a bobbin (winding core) 118 of the electrode sheet 101 of the roll shape can be supported by this core support 117.

The electrode sheet 101 of the roll shape supported by the core 119 and the core support 117 within the vacuum room 110 is placed under vacuum while the electrode sheet 101 is heated as mentioned above. Therefore, the moisture and the IPA unable to be sufficiently removed by the continuous drying are removed.

As mentioned above, the electrode sheet 101 is dried after the completion instead of during its formation. Therefore, the moisture and the IPA included in the electrode sheet 101 (sheet-shaped electrode) can be removed as much as possible. In its turn, the electrical double layer capacitor of high quality can be manufactured.

Here, with respect to the electrode sheet 101 in which the above vacuum drying is terminated, its remaining moisture amount, the remaining IPA quantity, the entire outer appearance, etc. are inspected. However, for example, the remaining moisture amount is set to 1500 ppm or less, and the remaining IPA amount is set to 800 ppm or less.

Re-adsorption of the moisture, etc. may be also prevented at the winding time of the electrode sheet 101 by arranging a dry booth (at a dew point lower than that of the interior of a dry area of −20° C. or less) continuously connected to the drying room 103, and performing a process for winding the electrode sheet 101 after the continuous drying and forming the electrode sheet 101 in the roll shape within this dry booth.

What is claimed is:

1. A polarizing property electrode for an electrical double layer capacitor, wherein
   the polarizing property electrode for the electrical double layer capacitor is constructed by mixing a binding material into activated carbon powder, and
   a concentration of an organic chemical compound included within the polarizing property electrode is 800 ppm, or less with respect to the weight of an electrode sheet.

2. The polarizing property electrode according to claim 1, wherein the concentration of an organic chemical compound included within the polarizing property electrode is 300 ppm or less with respect to the weight of an electrode sheet.

3. The polarizing property electrode according to claim 1, wherein the binding material comprises polytetrafluoroethylene.

4. The polarizing property electrode according to claim 1, wherein the organic chemical compound is selected from the group consisting of isopropyl alcohol, diisopropyl ether, propylene carbonate, and acetone.

5. The polarizing property electrode according to claim 1, wherein the organic chemical compound is free of the binding material.

* * * * *